(12) United States Patent
Feigenbaum

(10) Patent No.: US 6,339,785 B1
(45) Date of Patent: Jan. 15, 2002

(54) MULTI-SERVER FILE DOWNLOAD

(76) Inventor: Idan Feigenbaum, 3 Simtat Hatamarim, Kiryat Bialik 27043 (IL)

( * ) Notice: Subject to any disclaimer, the term of this patent is extended or adjusted under 35 U.S.C. 154(b) by 0 days.

(21) Appl. No.: 09/448,179

(22) Filed: Nov. 24, 1999

(51) Int. Cl.[7] .................................................. G06F 11/00
(52) U.S. Cl. ........................................ 709/213; 714/18
(58) Field of Search ................................ 709/201, 203, 709/217, 248, 213; 714/18, 776

(56) References Cited

U.S. PATENT DOCUMENTS

| | | | | |
|---|---|---|---|---|
| 5,602,992 A | * | 2/1997 | Danneels .................... | 709/248 |
| 5,774,660 A | * | 6/1998 | Brendel et al. ............. | 709/201 |
| 5,926,624 A | * | 7/1999 | Katz et al. .................. | 709/217 |
| 6,049,892 A | * | 4/2000 | Casagrande et al. ......... | 714/18 |
| 6,052,819 A | * | 4/2000 | Barker et al. ............... | 714/776 |
| 6,195,680 B1 | * | 2/2001 | Goldszmidt et al. ........ | 709/203 |

OTHER PUBLICATIONS

"New Features in GetRight 4.X" http://www.getright.com/new.html, Nov. 18, 1999 17:06.

* cited by examiner

*Primary Examiner*—David Wiley
(74) *Attorney, Agent, or Firm*—Eitan, Pearl, Latzer & Cohen-Zedek

(57) ABSTRACT

A method of downloading a file to a client, the method including the steps of a) determining the presence of the file on each of a plurality of secondary servers, b) retrieving a plurality of portions of the file from any of the servers, where at least a first of the portions is retrieved from a first of any of the servers and at least a second of the portions is retrieved from a second of any of the servers, and c) assembling the file at the client from the plurality of portions.

8 Claims, 4 Drawing Sheets

MULTI-SERVER FILE DOWNLOAD

FIELD OF THE INVENTION

The present invention relates to computer networks in general, and more particularly to methods and apparatus for downloading a file from a server.

BACKGROUND OF THE INVENTION

Transfer protocols for downloading files from serving computers (servers) to client computers (clients) via computer networks such as the Internet are well known in the art. Two commonly used transfer protocols include the File Transfer Protocol (FTP) and the Hypertext Transfer Protocol (HTTP). Generally speaking, in order to download a file a client establishes a single data transfer link with a server during a file transfer session through which the contents of the file is transmitted from the server to the client.

Recent developments in file transfer software which implement the various transfer protocols include the ability to begin downloading a file from a point other than the start of the file simply by instructing the server to begin transmitting the file from a specified byte offset. This has led to the development of file transfer software that is able to resume a download where the data transfer link has been broken in the middle of a download. The download is simply continued from the point at which the download stopped in another file transfer session via another data transfer link with the server.

This ability to download a file in sections has more recently led to the development of file transfer software which establishes multiple data transfer links with a server where different portions of a single file are downloaded via different data transfer links and reassembled at the client. This generally results in a file being downloaded to a client faster due to the greater cumulative throughput of multiple data transfer links with a single server as compared with that of a single data transfer link with the server.

SUMMARY OF THE INVENTION

The present invention seeks to provide improved methods and apparatus for downloading a file from a server.

There is thus provided in accordance with a preferred embodiment of the present invention a method for downloading a file to a client, the method including the steps of a) determining the presence of the file on each of a plurality of secondary servers, b) retrieving a plurality of portions of the file from any of the servers, where at least a first of the portions is retrieved from a first of any of the servers and at least a second of the portions is retrieved from a second of any of the servers, and c) assembling the file at the client from the plurality of portions.

Further in accordance with a preferred embodiment of the present invention the method further includes the step of d) determining the presence of the file on a primary server and thereafter performing the determining step a), and where the determining step a) includes determining whether the file on each of the plurality of secondary servers is a duplicate of the file on the primary server.

Still further in accordance with a preferred embodiment of the present invention the method further includes the steps of e) determining the performance of a plurality of the servers, f) ranking the plurality of servers from best performing to worst performing, and where the retrieving step b) includes retrieving from a selected plurality of the plurality of servers selected in order of their ranking from best performing to worst performing.

Additionally in accordance with a preferred embodiment of the present invention the determining the performance step includes determining the response time of the server.

Moreover in accordance with a preferred embodiment of the present invention the determining the performance step includes determining the throughput of the server.

Further in accordance with a preferred embodiment of the present invention the retrieving step b) includes discontinuing retrieving any of the portions from any of the servers that provides its portion at a performance level that falls below a predefined performance level, and continuing retrieval of the retrieval-discontinued portion from any other of the servers.

Still further in accordance with a preferred embodiment of the present invention the retrieving step b) includes retrieving using Files Transfer Protocol (FTP).

Additionally in accordance with a preferred embodiment of the present invention the retrieving step b) includes retrieving using Hypertext Transfer Protocol (HTTP).

BRIEF DESCRIPTION OF THE DRAWINGS

The present invention will be understood and appreciated more fully from the following detailed description taken in conjunction with the appended drawings in which.

DETAILED DESCRIPTION OF PREFERRED EMBODIMENTS

Figure 1:
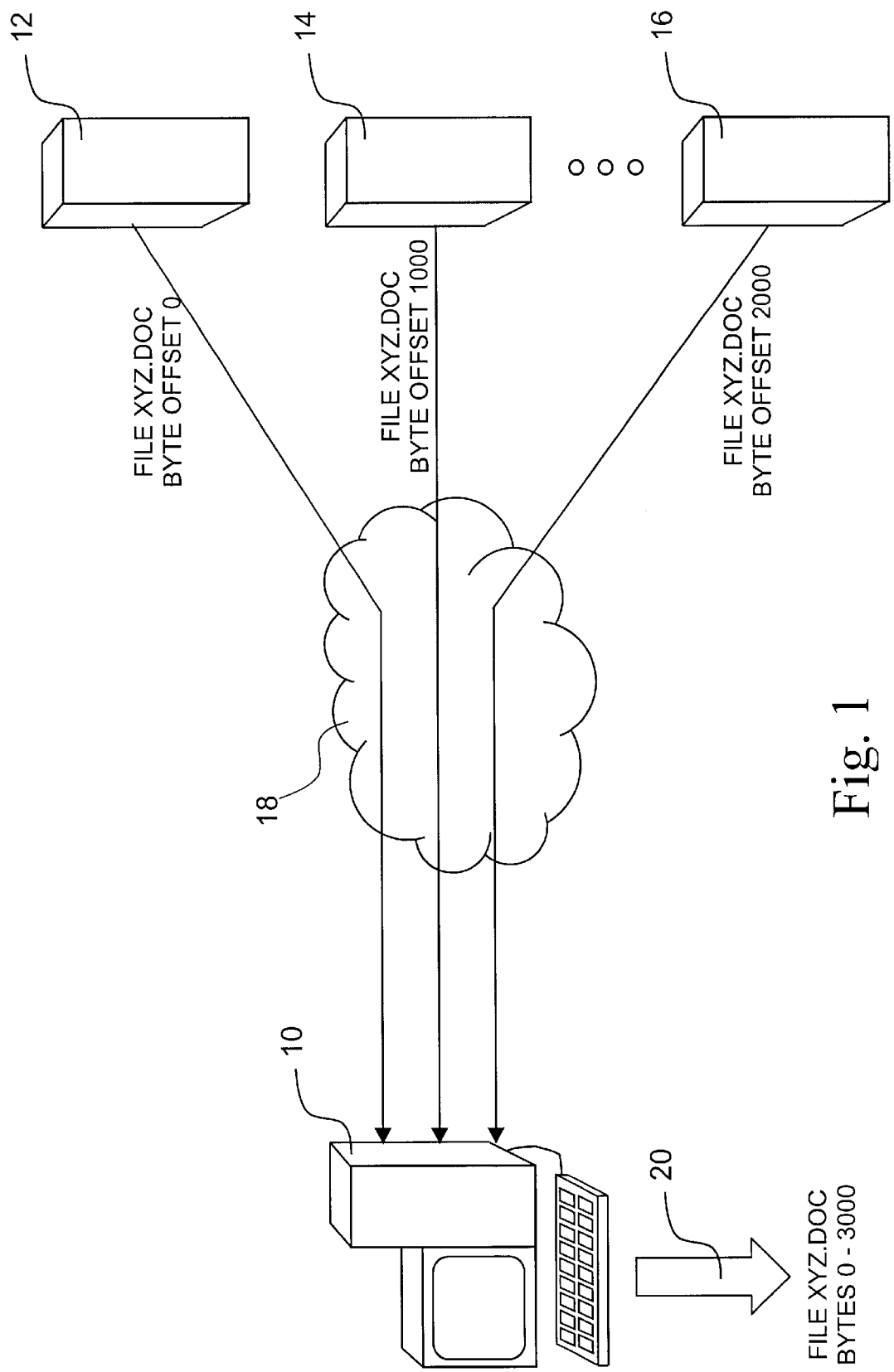
FIG. 1 is a simplified illustration of a multi-link, multi-server file transfer system, constructed and operative in accordance with a preferred embodiment of the present invention.

Reference is now made to FIG. 1 which is a simplified illustration of a multi-link, multi-server file transfer system, constructed and operative in accordance with a preferred embodiment of the present invention. In the system of FIG. 1 a client computer 10 is shown having established a data transfer link with each of three server computers 12, 14, and 16 via a network 18, such as the Internet. Although one link is shown between client 10 and each of three servers in FIG. 1, it is appreciated that more than one link may be established between client 10 and each of any number of servers. In the illustration file XYZ.DOC is shown being downloaded from servers 12, 14, and 16 in three separate portions using the File Transfer Protocol (FTP), the Hypertext Transfer Protocol (HTTP), or any other protocol known in the art that supports the downloading of a portion of a file starting at a location determined by the requestor, often starting at a location other than the beginning of the file, such as by specifying a byte offset. The portion being downloaded from server 12 begins at byte offset 0, the portion from server 14 begins at byte offset 1000, and the portion from server 16 begins at byte offset 2000. The three portions are then transferred to client 10 where they are then assembled into a single file XYZ.DOC comprising the three portions transferred from server 12, 14, and 16 and spanning bytes 0–3000, as is shown by an arrow 20.

Figure 2:
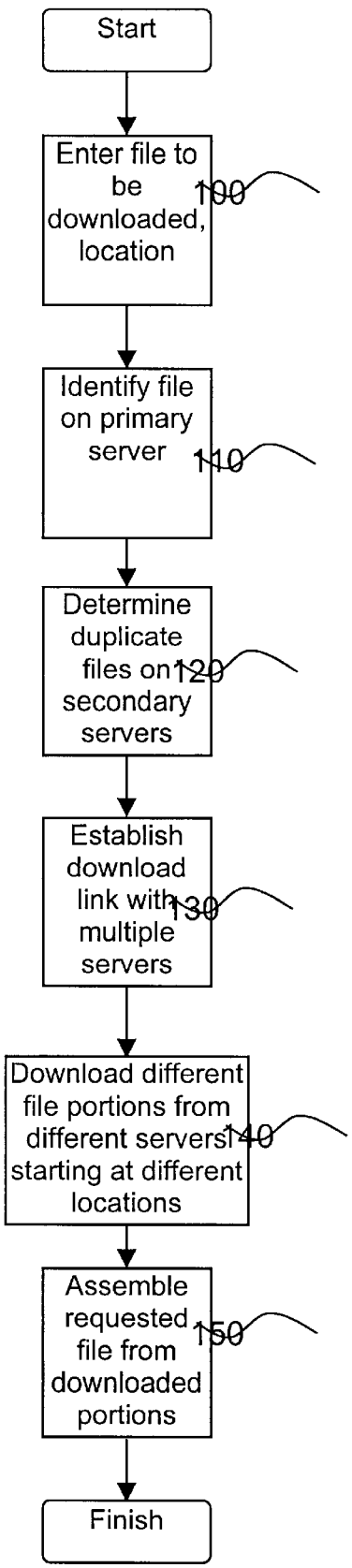
FIG. 2 is a simplified flowchart illustration of a method of operation of the system of FIG. 1, operative in accordance with a preferred embodiment of the present invention.

Reference is now made to FIG. 2 which is a simplified flowchart illustration of a method of operation of the system of FIG. 1, operative in accordance with a preferred embodiment of the present invention. The method of FIG. 2 may be implemented in client 10 using executable software, hardware, or any suitable combination thereof using conventional techniques. In the method of FIG. 2 a file to be downloaded is indicated at client 10 using any known data entry or selection technique, such as by clicking on a Hypertext Markup Language (HTML) link in a web page within a browser running on client 10 (step 100). In the embodiment of FIG. 2 the indication of the file preferably includes the location of a primary server on which the file may be found. This may be effected through the use of a Universal Resource Locator (URL) or any other location indicator known in the art. The file on the primary server is then identified by the client (step 110), typically to provide one or more file characteristics such as file name and size. Next, the presence of the file on one or more secondary servers is determined such that the file on a secondary server is a duplicate of the file on the primary server in that it has the same file characteristics as the file on the primary server (step 120). The client may maintain a list of the addresses of such secondary servers and/or may query search engines using known metasearching techniques. Once the primary and secondary servers are determined the client establishes one or more data transfer links with each of two or more servers (step 130) and instructs the servers to begin downloading portions of the file, such that each data transfer link conveys a different portion of the file and each server begins the download of each portion at a different location within the file as specified by the client (step 140). The number of servers and data transfer links chosen to download portions of the file may be determined using known statistical methods and measures of throughput, although a default number of servers and data transfer links may be specified to start with. The portions received at the client are then assembled to form the requested file (step 150).

Figure 3:
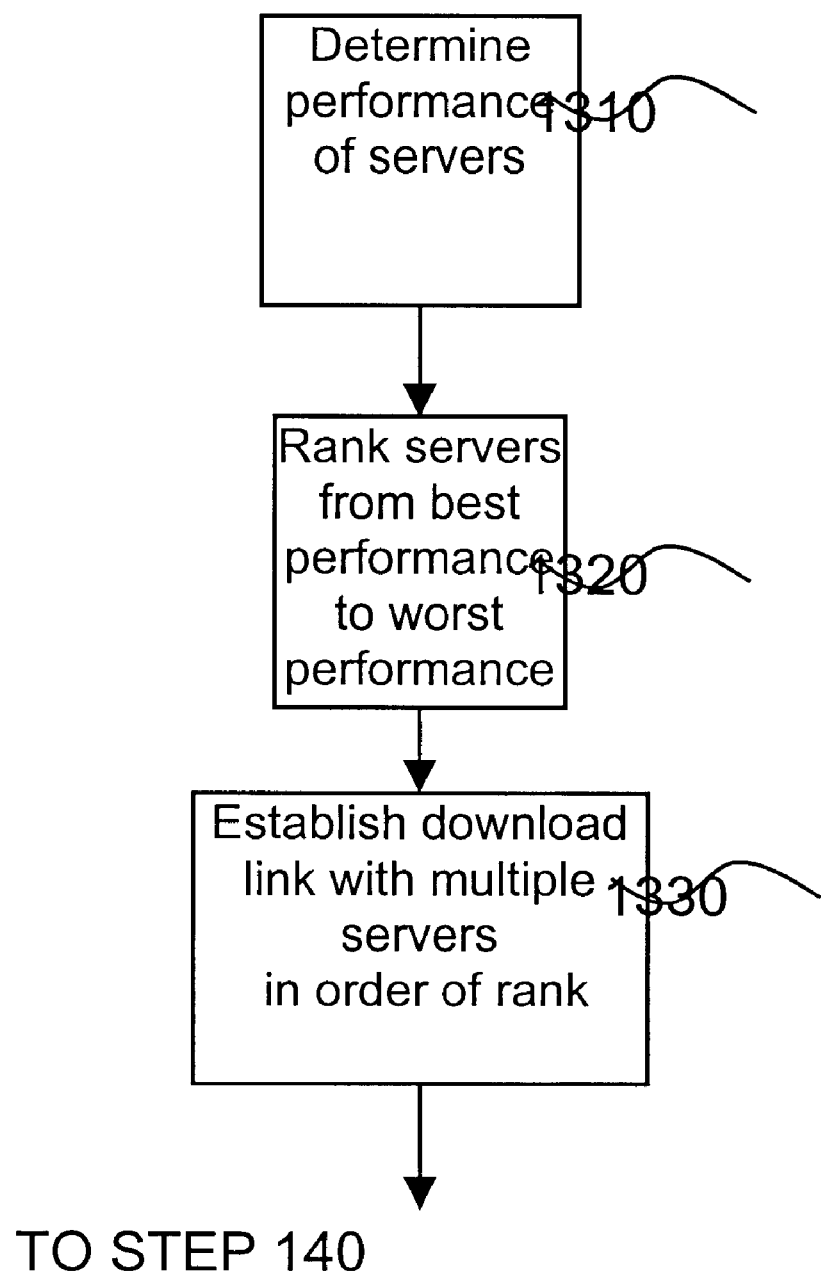
FIG. 3 is a simplified flowchart illustration of a method of implementation of step 130 of FIG. 2, operative in accordance with a preferred embodiment of the present invention.

Reference is now made to FIG. 3 which is a simplified flowchart illustration of a method of implementation of step 130 of FIG. 2, operative in accordance with a preferred embodiment of the present invention. In the method of FIG. 3 the client determines the performance of various primary and secondary servers using known techniques such as PINGing (step 1310) or other known performance measuring methods. The performance of a server may be expressed using any known performance measurements such as, but not limited to, response time and/or throughput. The servers are then ranked according to their speed from best performance to worst performance (step 1320). The servers from which the client downloads portions of the file are then preferably selected in order of their rank (step 1330).

Figure 4:
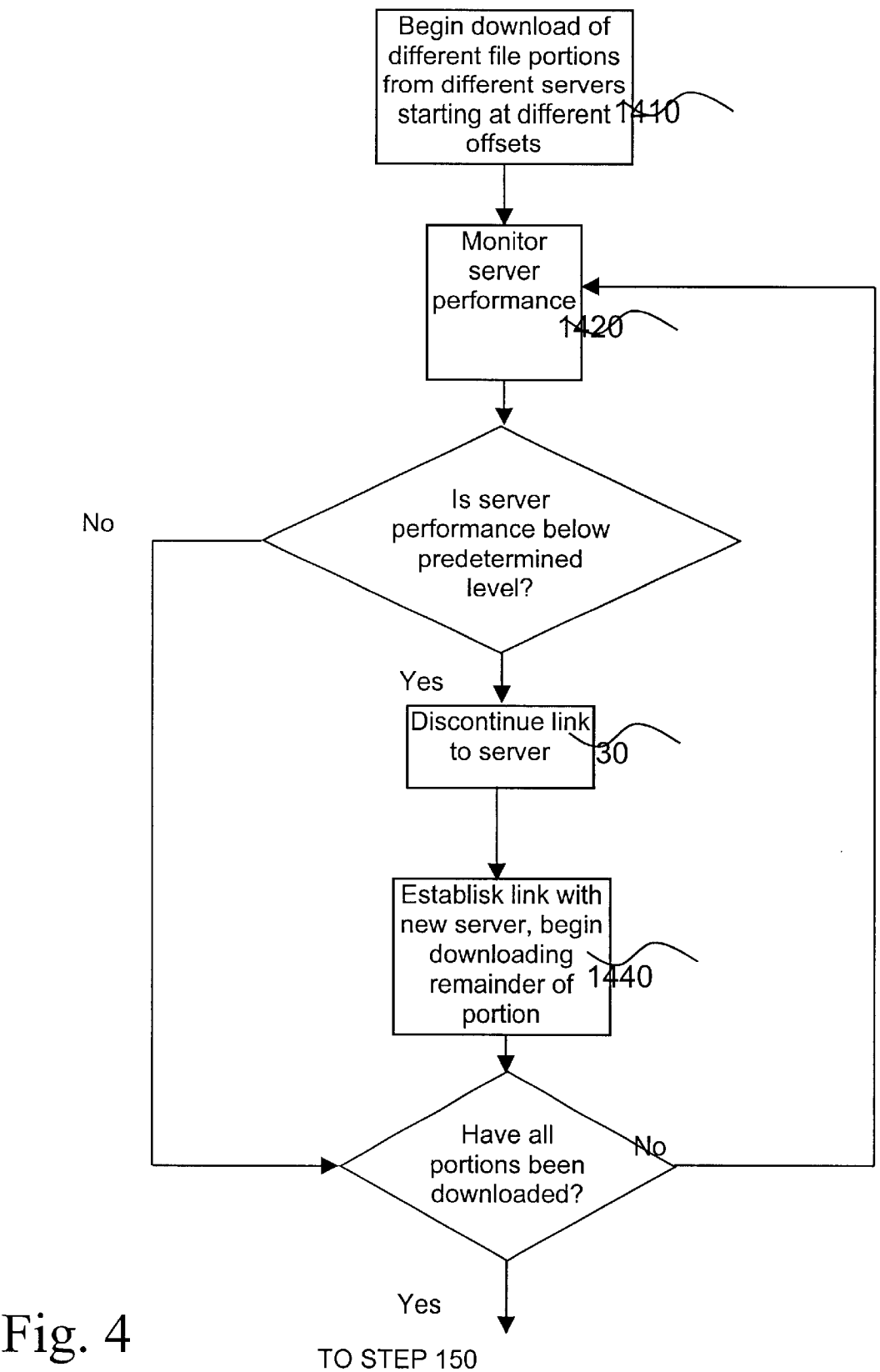
FIG. 4 is a simplified flowchart illustration of a method of implementation of step 140 of FIG. 2, operative in accordance with a preferred embodiment of the present invention.
Figure 2:
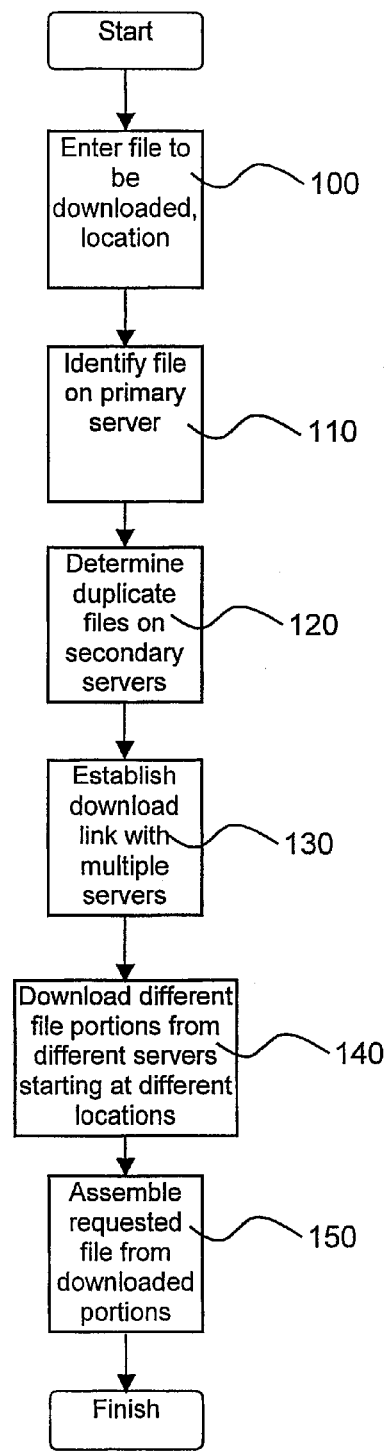
Figure 3:
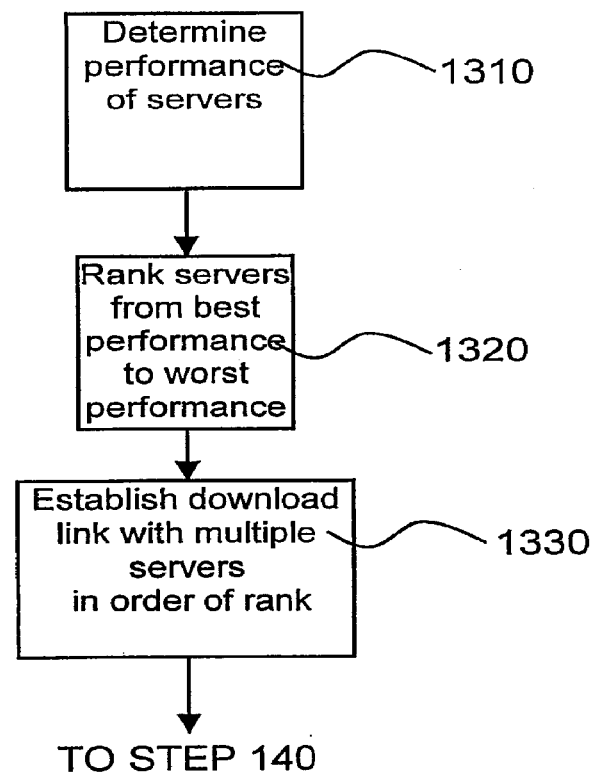
Figure 4:
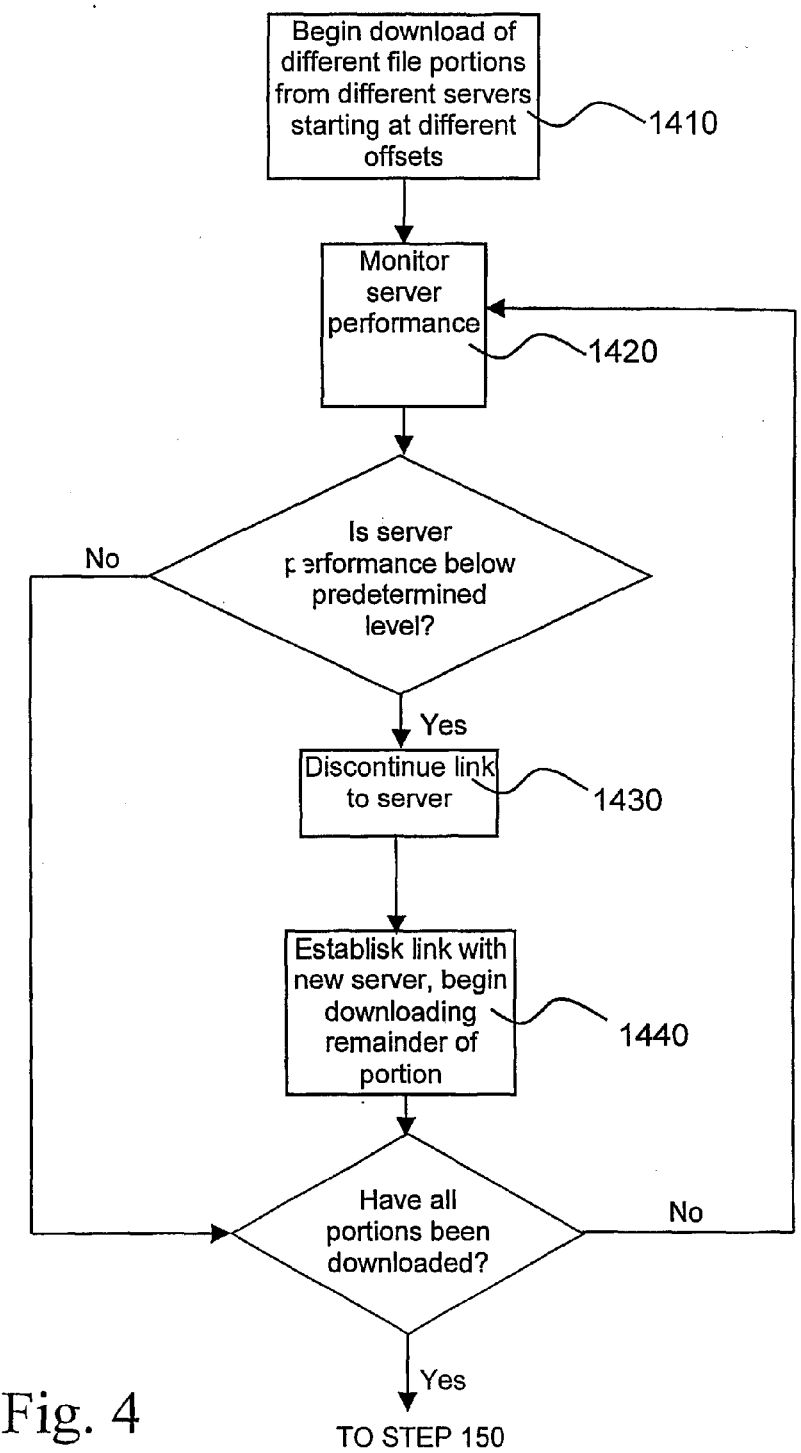

Reference is now made to FIG. 4 which is a simplified flowchart illustration of a method of implementation of step 140 of FIG. 2, operative in accordance with a preferred embodiment of the present invention. In the method of FIG. 4 the client instructs the servers to begin downloading portions of the file, such that each data transfer link conveys a different portion of the file and each server begins the download of each portion at a different location within the file specified by the client (step 1410). The performance of each server and/or each data transfer link as determined using conventional performance measurement techniques, such as bit rate, is preferably monitored periodically or continuously (step 1420). Should the performance of a server and/or data transfer link fall below a predefined performance level, the download via that server/data transfer link is preferably discontinued (step 1430). A data transfer link to a new server and/or new data transfer link to a current server is then established, and the remainder of the portion whose download was discontinued is downloaded through the link preferably starting from the location within the file at which the download was discontinued (step 1440). It is also appreciated that a data transfer link to a server may be discontinued in compliance with a user-directive not necessarily related to server performance.

While the methods and apparatus disclosed herein may or may not have been described with reference to specific hardware or software, the methods and apparatus have been described in a manner sufficient to enable persons of ordinary skill in the art to readily adapt commercially available hardware and software as may be needed to reduce any of the embodiments of the present invention to practice without undue experimentation and using conventional techniques.

While the present invention has been described with reference to a few specific embodiments, the description is intended to be illustrative of the invention as a whole and is not to be construed as limiting the invention to the embodiments shown. It is appreciated that various modifications may occur to those skilled in the art that, while not specifically shown herein, are nevertheless within the true spirit and scope of the invention.

What is claimed is:

1. A method for downloading a file to a client, the method comprising the steps of:
   a) determining the presence of said file on each of a plurality of secondary servers;
   b) retrieving a plurality of portions of said file from any of said servers, wherein at least a first of said portions is retrieved from a first of any of said servers and at least a second of said portions is retrieved from a second of any of said servers; and
   c) assembling said file at said client from said plurality of portions.

2. A method according to claim 1 and further comprising the step of:
   d) determining the presence of said file on a primary server and thereafter performing said determining step a), and wherein said determining step a) comprises determining whether said file on each of said plurality of secondary servers is a duplicate of said file on said primary server.

3. A method according to claim 1 and further comprising the steps of:
   e) determining the performance of a plurality of said servers;
   f) ranking said plurality of servers from best performing to worst performing, and wherein said retrieving step b) comprises retrieving from a selected plurality of said plurality of servers selected in order of their ranking from best performing to worst performing.

4. A method according to claim 3 wherein said determining the performance step comprises determining the response time of said server.

5. A method according to claim 3 wherein said determining the performance step comprise determining the throughput of said server.

6. A method according to claim 1 wherein said retrieving step b) comprises:
   discontinuing retrieving any of said portions from any of said servers that provides its portion at a performance level that falls below a predefined performance level; and continuing retrieval of said retrieval-discontinued portion from any other of said servers.

7. A method according to claim 1 wherein said retrieving step b) comprises retrieving using File Transfer Protocol (FTP).

8. A method according to claim 1 wherein said retrieving step b) comprises retrieving using Hypertext Transfer Protocol (HTTP).

* * * * *

UNITED STATES PATENT AND TRADEMARK OFFICE
CERTIFICATE OF CORRECTION

PATENT NO. : 6,339,785 B1
DATED : January 15, 2002
INVENTOR(S) : Feigenbaum

It is certified that error appears in the above-identified patent and that said Letters Patent is hereby corrected as shown below:

<u>Drawings,</u>
Delete drawing sheets 2-4, and substitute therefor the drawing sheets, consisting of drawing Figs. 2-4, as shown on the attached sheets.

Signed and Sealed this

Eighth Day of October, 2002

Attest:

Attesting Officer

JAMES E. ROGAN
*Director of the United States Patent and Trademark Office*